United States Patent Office 3,579,310
Patented May 18, 1971

3,579,310
PREPARATION OF ACICULAR RUTILE TiO₂
George L. Lewis, Wilmington, and Carl H. Muendel, Centerville, Del., assignors to E. I. du Pont de Nemours and Company, Wilmington, Del.
No Drawing. Continuation-in-part of application Ser. No. 624,716, Mar. 21, 1967. This application June 28, 1967, Ser. No. 655,984
Int. Cl. B01d 9/00; C01g 23/08
U.S. Cl. 23—301
11 Claims

ABSTRACT OF THE DISCLOSURE

Pigmentary single acicular rutile $TiO_2$ crystals, at least 50% by weight of the particules of which have an average cross-sectional dimension of 0.01 to 0.5 micron and a length-to-cross sectional ratio of 3:1 to 50:1, obtained by calcining at 725–1000° C., a blended titania-salt-promoter mixture made up of preformed $TiO_2$, a salt comprising sodium chloride, and an oxy-compound of phosphorus (phosphate), and leaching of the calcined product to recover the acicular rutile pigment.

RELATED APPLICATIONS

This application is a continuation-in-part of U.S. application Ser. No. 624,716 filed Mar. 21, 1967, now abandoned.

BACKGROUND OF THE INVENTION

This invention relates to the production of pigmentary inorganic $TiO_2$ crystals, and more particularly to the preparation of finely divided, pigmentary single rutile crystals in controlled particle size and slender, acicular form.

Titanium dioxide is a well known compound which exists in three crystalline modifications: anatase, rutile and brookite. Of these modifications, anatase and rutile are widely used in pigmentary applications such as paints, enamels, inks, ceramics, plastics, paper andd elusterants for synthetic fibers. Rutile is preferred for use in most of these applications due to its higher refractive index and greater chemical and light stability. In certain other applications where some reinforcement in product strength is desired, such as in papers, cermets, ceramics, and plastics, or in filtering media, fibrous $TiO_2$ is used. Fibrous $TiO_2$ products have a cross section of greater than 0.5 micron and a high axial ratio, i.e. a ratio of length to cross-sectional dimension of at least 10:1. In U.S. 2,980,510 the preparation of $TiO_2$ fibers is brought about by reacting a halide of titanium with a melt consisting of basic oxide and alkali metal borates or mixtures thereof. In U.S. 3,012,857 they are obtained by oxidizing a titanium subhalide in a molten salt; while in U.S. 3,030,-183 they can be prepared by reacting at 600–900° C. a titanium tetrahalide with oxygen in the presence of a metal halide melt. In each of these instances, $TiO_2$ in the form of long fibers is achieved, but the resulting products are not useful as pigments or pigmenting ingredients because of the relatively large cross-sectional diameter of the fibers. The terms "pigment" and "pigmenting" as used herein have reference to the ability of a material to significantly absorb or scatter visible or ultraviolet light.

SUMMARY OF THE INVENTION

It has now been found that an improved, novel form of pigmentary acicular $TiO_2$ can be obtained directly from a preformed $TiO_2$ material by calcining said $TiO_2$ in the presence of certain metal salts, and an oxy-compound of phosphorus useful as an acicular rutile crystal promoter; and that the acicular product from the conversion comprises pigmentary single rutile $TiO_2$ crystals which have an average cross-sectional dimension ranging from 0.01 to 0.5 micron, and preferably within the range of 0.01 to 0.3 micron, with the length to cross-sectional-diameter ratio of said particles being from about 3:1 to about 50:1.

The pigmentary products of this invention differ from the fibrous $TiO_2$ products of prior art in that the dimensions of these particles make them most useful in applications where the scattering of visible light, or the scattering plus absorption of ultraviolet light, combined with reinforcing strength, are of prime importance. An example of this is found in paint films.

In accordance with this invention, controlled growth is undertaken of acicular rutile particles from preformed $TiO_2$, in an oxy-phosphorus-salt melt, the rutile crystal pattern for such growth being set by the presence in the salt melt of a nucleant having the rutile $TiO_2$ crystalline structure and, usually, a particle diameter of substantially the same order of magnitude as the diameter of the acicular rutile product. Also, the rutile nucleant can have any of the following origins: (1) it may be formed in situ from the preformed $TiO_2$ during the course of the heating of the $TiO_2$-salt-promoter mix; (2) it may be formed in the preformed $TiO_2$ by precalcination without salt presence; or (3) it can consist of separately prepared rutile crystals. Of these three approaches, the latter two are preferred for use because they yield pigment products of more uniform particle size.

In practicing the invention it has been found essential that the melt contain not only a rutile crystal nucleant to act as a seed for setting the pattern of crystal growth, but also that there be present an additional source of titanium dioxide which is less stable in the salt melt than the rutile nucleant and which serves as a source material or nutrient, for growth of the acicular rutile crystals.

The preformed $TiO_2$, comprising a nutrient plus a suitable nucleant or material which will yield a nucleant in the process, can be derived from any desired source. Thus, it can comprise a rutile seeding material designed principally for use in the hydrolysis of titanium sulfate solutions to produce rutile pigment, such as that produced in accordance with a process disclosed in U.S. Pat. 2,479,637. If desired, the rutile seeding material can be partially dehydrated by freeze-drying, or by heating at about 110° C., or it can be calcined prior to use at relatively low temperatures, say from 500° C. to 700° C., to stabilize the rutile crystal structure of the seed. This titanium dioxide can then be employed in the salt-oxy-phosphorus melt as both a nutrient and the source of in situ-formed nucleant to yield the acicular rutile product of this invention. Alternatively, the rutile seed material from said patent or from a similar process, can be used to produce a rutile-seeded titanium hydrolysate, which hydrolysate can comprise the preformed titanium dioxide employed in the salt-oxy-phosphorus melt in the same manner as above described. In a preferred procedure, the rutile-seeded titanium hydrolysate can be precalcined at a temperature of from 600–900° C. for a period of up to eight hours to partially convert it to nucleant, and such precalcined titanium dioxide can be used as the third component of the salt-oxy-phosphorus melt. In a further preferred procedure, the nucleant in the salt melt can comprise fine particle size rutile $TiO_2$ produced by the pyrolytic oxidation of a titanium halide, especially titanium tetrachloride, obtained in accordance with, for example, the methods described in U.S. 2,488,439 or U.S. 2,791,490. If desired, this or other nucleant material may be added prior to, or during the hydrolysis of titanium salt solutions according to procedures of, for example, U.S. Reissue Pats. 18,854, or 18,790.

Although it is possible to carry out the process of the present invention by using a single source of preformed titanium dioxide which serves a dual purpose as a precursor of the nucleant for the acicular rutile crystal formation and as a nutrient for growth of these acicular crystals, as would be the case if rutile seeded hydrolysate alone is used as the preformed titanium dioxide source, the process is best carried out by having present in the salt melt a separately prepared rutile nucleant, and an additional source of titanium dioxide or nutrient, which is less stable in the salt melt than is the nucleant, and which serves as a growth-material source in forming the pigmentary, acicular products of the invention.

In one specific adaptation of the invention, preformed $TiO_2$ such as that produced in accordance with the procedures of U.S. 2,497,637, is intimately mixed with sodium chloride, and a compound of phosphorus, particularly a phosphate, which acts as a promoter of the acicular crystal configuration, and the mixture is then calcined at a temperature of at least 725° C. to produce the desired acicular rutile crystals which are then leached or otherwise treated to remove soluble salts and recover the acicular rutile pigment.

DESCRIPTION OF THE PREFERRED EMBODIMENT

In practically applying the invention, a thoroughly blended mixture, in the form of pellets, if desired, comprising preformed $TiO_2$, an alkali metal salt comprising at least 50 mol percent sodium chloride, and a phosphorus compound, preferably a sodium phosphate, is made up and then is heated to a temperature ranging from 725–1000° C. for a period of ½ to 10 hours. Preferably, heating is effected at temperatures ranging from 800° C. to 850° C. for a period of from 2 to 4 hours. The blend of titania-salt-promoter can be in various proportions, by weight within the following limits: Salt:$TiO_2$ in the range of from 0.05:1 to 2:1; salt:phosphorus compound, calculated on the basis of phosphorus, in the range of from about 5:1 to about 130:1. A preferred blend consists of a mixture NaCl:$TiO_2$ ranging from 0.5:1 to 1:1, and with a $NaPO_3$ content, calculated as this compound, of about 25% of the weight of the NaCl. The upper limit of NaCl to $TiO_2$ in such blend is determined chiefly by economics and by convenience of operation. When a dry cake or powder of $TiO_2$ is used, a blend of salt and $TiO_2$ in equal parts by weight will be found to provide a mix which remains substantially solid ("dry") upon calcination and affords a suitable medium for the formation and growth of acicular crystals of rutile. It is considered essential for the operation of this invention, that the reactant mix be so formulated that it remains in substantially dry state throughout the heating period, thus permitting a kiln-type operation to be readily undertaken. The titania-salt-phosphorus compound product which results from the calcination is then cooled and separation and recovery of the acicular rutile pigment component from the water soluble salt mix is brought about by water leaching the calcined product, preferably with accompanying agitation to break up the pellets and dissolve the salts present. Thereafter, the leached product is filtered and dried. The particles of acicular $TiO_2$ pigment are easily separated, and for most applications require only a light grinding treatment to obtain the desired final acicular, single crystal rutile pigment.

In our preferred method, the preformed $TiO_2$ is made up of a blend or mix of separately prepared nutrient and nucleant $TiO_2$ components. The nutrient component comprises finely divided $TiO_2$, in either anatase or rutile crystalline form, such as is recovered from the hydrolysis of a titanium sulfate or chloride solution. The $TiO_2$ is in less stable configuration and more reactive in the salt mix than is the nucleant $TiO_2$ component under the process conditions. The nucleant component comprises any finely divided, rutile crystalline $TiO_2$ having a particle size of less than about 0.2 micron, as determined by electron microscopy. Among useful forms thereof are $TiO_2$ pigments obtained from the calcination of a $TiO_2$ hydrolysate recovered from the hydrolysis of a titanium salt of a monovalent acid, e.g. titanium tetrachloride; or, as already indicated, $TiO_2$ recovered from the high temperature oxidation of titanium tetrachloride. The proportion of separately-prepared nucleant titanium dioxide to nutrient titanium dioxide is variable and can range from 1:100 to 1:4, depending on several considerations, including the desired aspect ratios of the product, the degree of purity of the titanium dioxide used as the nutrient, and the time and temperature under which the process is carried out. Preferably, ratios of separately-prepared nucleant to nutrient titanium dioxide ranging from 1:20 to 1:10 are employed.

One can prepare, for example, a blend of (1) the nutrient and nucleant titanium dioxide components, (2) sodium chloride, and (3) sodium phosphate promoter, in the weight ratios of 4:4:1, calculated as total $TiO_2$, NaCl and $NaPO_3$. In the mixing operation the components of the salt mix are thoroughly blended, and, if desired, can be pressed into pellets for the subsequent calcination treatment at temperatures ranging from 725° to 1000° C. for periods of from ½ to 10 hours. The time and the temperature of calcination depends on several factors. That is, for example, on the reactivity of the nutrient in the salt blend at the reaction temperature, the amount of nucleant present in the mix, as well as the amount of sodium chloride and of phosphate promoter used. A preferred time and temperature for a mix with a ratio of 4:4:1, by weight, of total $TiO_2$-to-salt-to-$NaPO_3$ promoter is 2 to 4 hours at 800–850° C. The product from the calcination is water-leached, preferably with agitation to break up the pellets if present, and to dissolve salts present, and then is filtered and dried to recover the acicular rutile in single crystal product in the pigmentary size ranges above mentioned.

In contrast to prior fibrous $TiO_2$ materials, the $TiO_2$ products from this invention are directly usable in various pigmenting applications. Advantageously, they are in finely divided, discrete, acicular single crystal rutile form, and have an average cross-sectional dimension ranging from 0.01 to 0.5 micron with a length-to-cross-sectional diameter ratio of from about 3:1 to about 50:1. The rutile particles of the pigment having an average cross-sectional diameter of 0.01 to 0.1 micron and length-to-width ratios mentioned are epecially useful as ultra-violet light screening agents or delustrants in artificial fibers or papers. Those having an average cross-sectional diameter of from 0.1 to 0.5 micron and especially in the range of from 0.1–0.3 micron and length-to-width ratios of from 3:1 to 50:1, are especially useful as white pigmenting ingredients in such applications as papers, paper coatings, paints, enamels, inks, rubber and plastic compositions where high pigment hiding power and whiteness are essential requisites. For purposes of this invention, discrete, acicular, rutile single crystals means acicular rutile crystals whose internal structure exhibits a high degree of perfection, i.e. freedom from faults, but which crystals may be twinned. The term "crystals" means an essentially fully dense solid composed of atoms arranged in an orderly repetitive array bounded by plane surfaces which are the external expression of internal structure.

To a clearer understanding of the invention the following specific examples are given. Parts mentioned therein are by weight. These examples are merely illustrative and are not to be considered as limiting the underlying principles and scope of the invention.

EXAMPLE I

The preformed titanium dioxide used in this example was prepared by freeze-drying a portion of a separately prepared coagulated, acidified suspension $TiO_2$ seeding material prepared in accordance with the disclosure of U.S. 2,479,637 intended for use as a seeding agent in the hydrolysis of a titanium sulfate solution to obtain a rutile-seeded anatase $TiO_2$ hydrolysate adapted to convert to rutile on subsequent calcination. This freeze-dried $TiO_2$, on analysis, contained 50% by weight water. 40 parts of this freeze-dried product (containing 20 parts $TiO_2$) was thoroughly ground with 20 parts NaCl and 5 parts $NaH_2PO_4$. The ground mixture was placed in a suitable crucible and heated in a muffle furnace for five hours at 825° C. Thereafter, the calcined product was cooled and the charge of material was subjected to water-leaching to remove soluble salts therefrom and recover the $TiO_2$ pigment product, which on being examined by microscopic and X-ray diffraction techniques, was found to contain discrete, acicular single crystals of pigmentary rutile of from 0.01 to 0.03 micron in cross-sectional diameter, with length-to-cross sectional ratios of from 3:1 to 50:1.

EXAMPLE II

A portion of a raw $TiO_2$ pigment hydrolysate from a conventional hydrolysis of a titanium sulfate solution in accordance with the procedure disclosed in U.S. Reissue Pat. 18,854 was washed free of superficial acid and impurities, and acid-heat treated in accordance with the procedures described in U.S. 2,305,368 to remove undesired additional chromium and vanadium impurities and to improve its whiteness. The product was again washed free of superficial acid and was then dried at about 110° C. Two and one half parts of this dried cake (analyzing 84.6% $TiO_2$, 4.5% $H_2SO_4$, the remainder $H_2O$) was then ground in a mortar with 2.5 parts of NaCl and 0.11 part of $NH_4H_2PO_4$, until thorough mixing was attained. This mixture was placed in a porcelain crucible and heated in a muffle furnace at 1000° C. for a period of 2 hours. The calcined charge, after cooling was water-leached to remove soluble salts and the recovered $TiO_2$ product was examined by microscopic and X-ray diffraction techniques and found to contain acicular, single crystals of rutile which had a cross-sectional diameter of about 0.12 to about $0.5\mu$ and a length-to-width ratio of about 3:1 to about 25:1.

EXAMPLE III 100 parts of titanium dioxide employed as preformed $TiO_2$ in this example was obtained as filter cake from a rutile-seeded hydrolysis of titanium sulfate solution in accordance with the procedures of U.S. Pat. 2,479,637. Prior to use, the $TiO_2$ was washed to remove acid and impurities in the supernatant hydrolysis liquor, was acid-treated as in Example II to remove adsorbed impurities, was washed again, dried at 110° C., to 150° C., ground to break up lumps, and then was calcined in a muffle furnace at 750° C. for eight hours. The calcined $TiO_2$ product on analysis was found to contain 0.13% $SO_4^=$, and, on being subjected to X-ray diffraction analysis was found to contain 25% $TiO_2$ in the rutile crystal form.

Sodium chloride (Fisher Reagent Grade Cat. #271) employed as the metal salt in this example was finely ground and dried overnight at 150° C. in a muffle furnace.

Sodium metaphosphate (Baker and Adamson Reagent Code 2262) employed as a promoter in this example was finely ground and dried overnight before use.

Pellets employed in the calcination in this example were prepared by mixing 5.0 parts of the above precalcined titania, with an equal weight of the previously ground and dried NaCl, and 1.25 parts of the previously prepared $NaPO_3$, through shaking in a plastic vial with plastic balls for ½ hour. The mix was then pelletized by pressing at 2300 p.s.i., the resulting pellets weighing about ½ gram and measuring about ⅝″ diameter.

Using a 20 ml. platinum crucible with a loosely fitting cover, these pellets were calcined singly therein in a muffle furnace. The furnace with contained crucible was heated for two hours to bring the temperature up to 850° C., and the temperature was held at this level for four hours. The heat was then turned off and the crucible and its contents cooled in the furnace for a two-hour period.

The pellets after calcination were found, for the most part, to have retained their shape, but were easily broken up upon leaching in boiling water. The pellets were leached for two hours, then filtered and washed salt free and the washed titania product was dried at 150° C.

The titania pigment product recovered from the above calcination, on being examined microscopically, was found to consist of particles more than 90% by weight of which were acicular within the dimensions of 0.15 to $0.5\mu$ in diameter with a length-to-width ratio of from about 3 to 1 to about 15 to 1. On X-ray diffraction analysis, the $TiO_2$ product was found to be 100% rutile.

EXAMPLE IV

A portion of the washed titanium dioxide cake, produced from the hydrolysis of a titanium sulfate solution seeded in accordance with U.S. 2,479,637 to give rutile during subsequent calcination, was calcined for 4 hours at 650° C. Twenty-four parts of this calcined cake was mixed with 30 parts of a mixture of 24 parts of pulverized sodium chloride and 6 parts of sodium metaphosphate, $NaPO_3$. The mixture of $TiO_2$, NaCl, and $NaPO_3$ was calcined in a muffle furnace at 825° C. for 4 hours. The calcined cake was washed to remove salts and was dried at 110° C. Microscopic examinations showed pigmentary acicular $TiO_2$ particles, of which about 50% by weight had a particle size range of about 0.1 to about 0.5 micron cross-sectional diameter. X-ray diffraction analysis showed the crystalline structure of the $TiO_2$ product to be 100% rutile.

EXAMPLE V

Using the same general procedure of Example III but varying the precalcination conditions applied to the titania used in the mix and the calcination temperature of the salt-titania-promoter mix, as shown in the following Table I, a series of acicular rutile pigment products as described in the table was prepared with the results shown. Each of the acicular $TiO_2$ products of this example was found to be predominantly in the single-crystal form, as determined by X-ray diffraction analysis and electron-microscopic studies.

TABLE I

| | Precalcination conditions for $TiO_2$ | Analysis of precalcined $TiO_2$ | Wt. ratios for $TiO_2$ salt/promoter mix ($TiO_2$/NaCl/$NaPO_3$) | Calcination of mix | Product obtained |
|---|---|---|---|---|---|
| (a) | 750° C./8 hours | 25% rutile, 0.13% $SO_4$ | 1:1:0.25 | 850° C./8 hours | Similar to Ex. 3. |
| (b) | do | do | 1:1:0.25 | 860° C./4 hours | Do. |
| (c) | do | do | 1:0.5:0.125 | 875° C./4 hours | Do. |
| (d) | 750° C./4 hours | 13% rutile 0.23% $SO_4$ | 1:1:0.25 | 860° C./4 hours | 90% by wt. was 0.1 to $0.5\mu$ cross sectional diameter; l./d. equals from 3/1 to 15/1; 100% rutile. |
| (e) | do | do | 1:0.5:0.125 | do | Do. |
| (f) | No precalcination, dried at 150° C. | | 1:0.2:0.05 | 825° C./8 hours | At least 50% of product 0.1 to $0.4\mu$, otherwise like above examples. |

EXAMPLE VI

This and succeeding Examples VII and VIII are illustrative of applications of the invention involving the preparation of acicular rutile through use and presence of a separately prepared $TiO_2$ nucleant plus a nutrient in a salt mix subjected to calcination.

In this example, the following components were blended by shaking them together in a high speed ball mill for one-half hour to form the titania-salt-promoter mix:

(a) 4.5 parts of nutrient $TiO_2$ obtained from a conventional hydrolysis of a titaniferous acid sulfate solution, was washed acid free, dried at 150° C., and micropulverized;
(b) 0.5 part of nucleant $TiO_2$ obtained from the high-temperature oxidation of $TiCl_4$ and having a particle size primarily in the range of 0.1 to 0.2 micron;
(c) 5.0 parts of sodium chloride, micropulverized and dried at 150° C.; and
(d) 1.25 parts of sodium metaphosphate $NaPO_3$ micropulverized and dried at 150° C.

After the blending operation, the resulting mix was pelletized at 2300 p.s.i. to obtain ½ gram, ⅝" diameter pellets. These were calcined at 800° C. for 4 hours in a muffle furnace under an atmosphere of ambient air. After calcination, the pellets were found, for the most part, to have retained their shape, but were easily broken up when leached in boiling water. The leached titanium dioxide product was filtered and dried at 150° C. and examined microscopically. It was found to consist of particles, more than 90% by weight of which were acicular within the range of 0.1 to 0.5 micron cross-sectional diameter, and of ratio of length to cross-sectional diameter of about 3:1 to 50:1. On X-ray diffraction analysis the product was found to consist of 100% rutile pigment.

EXAMPLE VII

Using the same procedure described in Example VI, a titania-salt-promoter mix was prepared consisting of, by weight, (a) 4.5 parts nutrient $TiO_2$ from an anatase hydrolysate dried at 150° C. and micropulverized, (b) 0.5 part nucleant $TiO_2$ from high temperature oxidation of $TiCl_4$ and having a particle size primarily in the range of 0.1 to 0.2 micron, (c) a salt mixture of 2.5 parts NaCl and 3.19 parts KCl, this being a 50:50 molar mixture of these salts and, (d) 1.25 parts hydrous $Na_4P_2O_7$. After pelletizing as is described in Example VI, portions of the mixture were calcined under three different temperature conditions: at 750° C. for 2 hours, at 800° C. for 2 hours, and at 850° C. for 2 hours. In each case the resulting pigment product contained 98 to 100% rutile and exhibited acicularity, with more than 90% by weight of the products showing particles within the range of 0.1 to 0.5 micron and a length to diameter ratio of 3:1 to 50:1.

EXAMPLE VIII

Example VI was duplicated, except that the pellets were calcined at a temperature of 850° C. (rather than 800° C.) for four hours. The product after leaching, filtering, and drying was found to be almost identical to the acicular 100% rutile pigment product of Example VI.

EXAMPLE IX

Example VI was duplicated in preparing five additional samples of $TiO_2$ pigment, except that each sample was prepared with a different sodium oxy-phosphorus compound in lieu of sodium metaphosphate employed in Example VI. Thus, a sample was prepared with 1.25 parts of $NaH_2PO_4$, another with 1.25 parts of $Na_2HPO_4$, another with 1.25 parts $NaP_2O_7$, another with 1.25 parts of $Na_5P_3O_{10}$ and another with 1.25 parts of $H_3PO_4$. All $TiO_2$ products from these variations were found to be similar to that of Example VI, as determined by electron microscopic and X-ray diffraction examination.

EXAMPLE X

In preparing the acircular rutile product of this example, the following ingredients were ground together and pressed into a pellet:

4.5 grams of previously washed and dried (110° C.) hydrolysis cake, produced from a titanium sulfate solution
0.5 gram of titanium dioxide produced by high temperature oxidation of titanium tetrachloride
2.5 grams NaCl
6.09 grams $Na_2SO_4$
1.25 grams $Na_4P_2O_7$ These proportions of ingredients were calculated to meet the following requirements:

NaCl and $Na_2SO_4$, each 50 mol percent of the total salt component of the mix
Weight proportion of nucleant $TiO_2$ to total $TiO_2$: 1 to 10

The pellet was calcined at 800° C. for 2 hours in an open crucible after which it was leached and the product examined microscopically. The acicular rutile produced was similar in amount and particle size to that of Example VI.

EXAMPLE XI

Using the same procedure as in the previous example, but using 7.45 g. $K_2SO_4$ instead of 6.09 $Na_2SO_4$ to make up the 50–50 molar salt mixture of NaCl and sulfate, a product similar in amount and quality to that obtained in Example VI was obtained.

As already noted, among valuable commercial uses for the products of this invention the following can be mentioned: as ultraviolet screening agents, for example, in plastics, synthetic fibers, and paints and varnishes; delustrants in synthetic fibers; as opacifiers in flat paints, in paper, in paper coatings and in plastics and synthetic fibers, for example, nylon. A particular advantage afforded by the products, being in single-crystal form, resides in the property of the crystals exhibiting greater resistance to breakage during incorporation in paint dispersions or in other applications such as in the delustering of rayon or other synthetic fibers.

In practically adapting the invention, it will be evident that suitable adjustment of the time and temperature of operation applicable to various compositions of titania-salt-promoter mixes to which the invention is applicable can be observed in order to produce a desired high yield of acicular pigmentary rutile crystals in the size ranges mentioned, while maintaining conditions of composition, time, and temperature such that the mix remains substantially dry throughout the process. Hence, the range of possible composition mixes and the times and temperatures used in their calcination treatment are limited only by the scope of the appended claims.

As noted, the preformed titanium dioxide useful as a source material herein can comprise raw pigment anatase or rutile hydrolysates resulting from the hydrolysis of a titanium salt solution, e.g. a sulfate or chloride and colloidal $TiO_2$, in accordance with, for example, the disclosures of U.S. Reissue Pats. 18,854 and 18,790. The hydrolysate can be used directly after being washed essentially free of superficial acid and soluble impurities, but while still containing up to about 8% adsorbed sulfuric acid. Alternatively, it can be calcined prior to use to remove adsorbed sulfuric acid.

Preferably, the performed titanium dioxide source material comprises a product from the hydrolysis of a titanium sulfate solution nucleated with a titania seeding agent adapted to crystallize the $TiO_2$ in the rutile configuration on subsequently heating the hydrolysate to a temperature in excess of about 700° C., as shown in U.S. 2,479,637. In preparing such rutile-seeded hydrolysate for use in the process, the hydrolytically precipitated $TiO_2$ is washed thoroughly to remove supernatant liquor and dissolved impurities and then is subjected to a conventional acid-heat treatment, such as described in U.S. 2,305,368 which removes substantially all additional impurities such as chromium and vanadium, and to improve pigment whiteness. Thereafter, the hydrolysis cake is again washed and dried at about 110° C. Prior to use in the salt mix, the dry $TiO_2$ cake may be calcined at temperatures ranging from 600° C. to about 900° C. for a period of up to 8 hours. Usually, calcination temperatures ranging from about 700 to 800° C. and periods of time from about 2 to about 8 hours will suffice for this purpose. This preliminary calcination provides a twofold effect: (1) At least a part of the adsorbed sulfate present is eliminated from the titania and (2) nucleant rutile crystals are formed. Recourse to temperatures in the higher part of the ranges mentioned and longer holding times will be found to increase the nucleant size and decrease the residual sulfate content of the titania. Preformed titania found especially useful in the invention comprises that which has been calcined under time and temperature conditions such that the calcined material shows by X-ray diffraction analysis that about 10 to about 60% of the total $TiO_2$ content is in the rutile crystal structure, and, on chemical analysis, the product has a residual sulfate content of from about 0.05 to about 0.5%. In one preferred method, this calcined $TiO_2$ can be blended in equal weight with NaCl and a 25% by weight amount, based on the NaCl used, of phosphorus-bearing promoter, calculated as $NaPO_3$, and the blend calcined for four hours at 850° C.

While sodium chloride alone is a preferred salt for use in the titania-salt-promoter mix, the invention is not to be construed as limited to that compound. Thus, NaCl or NaCl in combination with (1) up to 50 mol percent of potassium chloride, or (2) up to 50 mol percent of one or more alkali metal sulfates, or (3) up to 50 mol percent of a combination of potassium chloride and alkali metal sulfates can be employed. If desired, minor amounts of sodium or potassium bromides and iodides can also be included with these salts in the reaction mixture. For purposes of this invention the term "salt" designates the portion of the calcination mix which comprises halides, sulfates, or a combination of these. It is preferred, but not essential, that the portion of the salt which is added as a separate ingredient in the mix (that is, uncombined with one of the other ingredients, especially the preformed titania) be finely ground prior to use in the mix.

When the salt portion of the mix comprises an alkali metal sulfate, a portion or all of the sulfate may be included as adsorbed sulfate present in the preformed titanium dioxide. Thus, the introduction of alkali metal sulfate into the calcination mix would occur when titanium dioxide obtained from hydrolysis of a titanium sulfate solution is used without precalcination of said titanium dioxide. As stated above, such hydrolysis product, even after thorough washing (and drying at about 110° C. if desired) retains sulfuric acid to about 8% of the weight of the dried cake. This retained sulfuric acid will then become a part of the titania-salt-promoter mix and will, upon calcination, constitute a sulfate portion of the reactant mixture. It has been found that up to 50 mol percent of the total salt component of the titania-salt-promoter mix may be made up of one or more alkali metal sulfates, provided the remaining 50 mol percent of the salt is sodium chloride.

Use is also contemplated in the invention of any inorganic or organic oxy-phosphorus compound or mixture which will act as an acicularity promoter of the titania crystallized from the mix. Compounds of this type include any sodium or other alkali metal phosphate, such as $NaPO_3$, $Na_3PO_4$, $Na_2HPO_4$, $NaH_2PO_4$, $Na_4P_2O_4$, $Na_5P_3O_{10}$, $K_3PO_4$, $K_2HPO_4$, $KH_2PO_4$, $KPO_3$, etc.; phosphorus oxide such as $P_2O_3$ or $P_2O_5$; oxy-acid of phosphorus, such as phosphorus or phosphoric acids, $H_3PO_3$, $H_4P_2O_5$, $H_3PO_4$, $H_4P_2O_7$, $HPO_3$; and organic phosphates such as, for example, monocresyl phosphate, which will not volatilize during heating of the salt-$TiO_2$ melt. If desired, the promoter can comprise an ammonium phosphate compound, such as monobasic or dibasic ammonium phosphate, which upon heating in the titania-salt-promoter mix at the reaction temperature will provide at least one of the above named phosphorus compounds. By "oxy-phosphorus compound" is meant an oxygen-containing compound of phosphorus which upon heating or hydrolysis will yield an oxy-acid of phosphorus or an oxide of phosphorus. As with the salt, it is preferred, but not essential, that the phosphate be finely ground prior to employment in the preparation of the titania-bearing mix.

All of the calcinations were carried out under ambient air which contained some moisture. It has been found that adding moderate amounts of moisture to the air and promoting contact of the moist air with the reactant blend during calcination proves beneficial to acicularity in a degree that varies somewhat with the choice of phosphorus compound.

We claim:
1. A process for producing rutile in discrete, acicular, single crystal particles with at least 50% by weight of said particles having a cross-sectional diameter of from 0.01 to about 0.5 micron and a ratio of length to cross-sectional diameter ranging from 3:1 to 50:1 comprising calcining in substantially non-flowing solid state at temperatures ranging from about 725° to 1000° C. and for periods ranging from about ½ to about 10 hours, a blended mixture of (1) preformed titanium dioxide comprising a seeding amount of rutile titanium dioxide, (2) a salt selected from the group consisting of (a) sodium chloride, (b) at least 50 mol percent sodium chloride with at least one other alkali metal salt selected from the group consisting of chlorides and sulfates and (3) an oxy-phosphorus compound, employing in said mixture a ratio of salt to titanium dioxide, by weight, of from about 0.05 to 1 to about 2 to 1, and ratio of salt to oxy-phosphorus compound, calculated on the phosphorus present, from about 5:1 to about 130:1, leaching the product from the calcination to remove soluble salts therefrom, and recovering the desired acicular rutile.

2. The process of claim 1 in which the calcination is carried out in the presence of air containing water vapor.

3. The process of claim 1 in which the oxy-phosphorus compound is inorganic and selected from the group consisting of monosodium orthophosphate, disodium orthophosphate, sodium pyrophosphate, sodium metaphosphate, sodium tripolyphosphate and orthophosphoric acid.

4. The process of claim 1 in which said salt is sodium chloride present in an amount ranging from 50 to 100% based on the weight of the $TiO_2$ present in the mixture.

5. The process of claim 1 in which the blend of said salt and $TiO_2$ is in equal parts by weight.

6. The process of claim 1 in which the preformed titanium dioxide is an anatase $TiO_2$ hydrolysate from the hydrolysis of a titanium sulfate solution.

7. A process of claim 1 in which the preformed titanium dioxide is a $TiO_2$ hydrolysate from the hydrolysis of a rutile-seeded titanium sulfate solution.

8. The process of claim 1 in which the preformed $TiO_2$ comprises nucleant rutile, the particles of which are in the size range of 0.01 to 0.2 micron in cross-sectional diameter, and nutrient $TiO_2$ which is less stable in the blended mixture at the calcination temperature than said nucleant rutile.

9. The process of claim 8 in which the nucleant component is rutile titanium dioxide from the pyrolytic oxidation of $TiCl_4$.

10. The process of claim 8 employing an oxy-phosphorus compound selected from the group consisting of monosodium orthophosphate, disodium orthophosphate, sodium pyrophosphate, sodium metaphosphate, sodium pyrophosphate, sodium metaphosphate, sodium tripolyphosphate and orthophosphoric acid and in which the weight ratio of total TiO$_2$: halide salt: phosphorus compound, calculated as NaPO$_3$, is 4:4:1, and the blended mixture is calcined at a temperature ranging from 750° C. to 875° C. for a period of 2–8 hours in the presence of air containing water vapor.

11. The process of claim 8 in which the nucleant rutile is a previously calcined TiO$_2$ with from 10 to 60% of its total titanium dioxide content being in the rutile crystal configuration, a phosphorus compound selected from the group consisting of monosodium orthophosphate, disometaphosphate, sodium tripolyphosphate and orthophosphoric acid is employed, and in which the weight ratio of total TiO$_2$:NaCl:phosphorus compound calculated as NaPO$_3$, is 4:4:1, and the blended mixture is calcined at a temperature ranging from 750° C. to 875° C. for a period of 2–8 hours in the presence of air containing water vapor.

References Cited
UNITED STATES PATENTS

| | | | |
|---|---|---|---|
| 1,360,737 | 11/1920 | Farup | 106—300 |
| 1,605,851 | 11/1926 | Monk | 106—300 |
| 2,290,539 | 7/1942 | Cole | 23—202 |
| 2,406,465 | 8/1946 | Keats | 23—202 |
| 2,486,465 | 11/1949 | Copeland | 23—202 |
| 3,329,484 | 7/1967 | Long et al. | 23—202 |

NORMAN YUDKOFF, Primary Examiner

R. T. FOSTER, Assistant Examiner

U.S. Cl. X.R.

23—300, 202

PO-1050
(5/69)

UNITED STATES PATENT OFFICE
CERTIFICATE OF CORRECTION

Patent No. 3,579,310　　　　　　Dated May 18, 1971

Inventor(s) George L. Lewis and Carl H. Muendel

It is certified that error appears in the above-identified patent and that said Letters Patent are hereby corrected as shown below:

Column 10, line 37, "and ratio of salt" should read -- and a ratio of salt --; and line 38, "present, from about" should read -- present, of from about --; line 73 cancel "sodium pyrophosphate, sodium metaphosphate,". Column 11, line 10, cancel "diso-" and insert -- disodium orthophosphate, sodium pyrophosphate, sodium --.

Signed and sealed this 24th day of August 1971.

(SEAL)
Attest:

EDWARD M. FLETCHER, JR.　　　　WILLIAM E. SCHUYLER, JR.
Attesting Officer　　　　　　　　Commissioner of Patents